United States Patent Office 3,645,928
Patented Feb. 29, 1972

3,645,928
PROCESS FOR THE PREPARATION OF
POLYLACTAM FOAMS
Nobuo Wakamura, Hiroshi Okada, Atsushi Osakada, and Takashi Tanaka, Otsu-shi, Japan, assignors to Toray Industries, Inc., Tokyo, Japan
No Drawing. Filed July 16, 1969, Ser. No. 842,394
Int. Cl. C08j 1/20, 1/26
U.S. Cl. 260—2.5 N                  8 Claims

ABSTRACT OF THE DISCLOSURE

An improved process is provided for the preparation of polylactam foams in which ε-caprolactam or a mixture of lactams containing more than 50 mol percent of ε-caprolactam is anionically polymerized in the presence of an alkali catalyst, a blowing agent and a promoter at a temperature of about 100–180° C. The improved process is particularly characterized by the use of a promoter which when added to a mixture of lactam and alkali catalysts causes the mixture to solidify due to crystallization within 3 minutes and to produce a polylactam having a relative viscosity of at least 3 when a conversion reaches equilibrium. The polylactam foams of this invention exhibit improved mechanical and chemical properties in comparison with the polylactam foams of the prior art which make them especially useful for the manufacture of low density articles requiring relatively high strength and chemical resistance.

BACKGROUND OF THE INVENTION

(1) Field of the invention

This invention relates to an improved process for the preparation of polylactam foam. More particularly, this invention is concerned with the anionic fast polymerization of ε-caprolactam or mixtures of lactams to provide polylactam foams with a low density and improved mechanical and chemical properties.

(2) Description of the prior art

Processes are disclosed in the prior art for the anionic fast polymerization of ε-caprolactam using an alkali catalyst. These processes are used to manufacture large shaped articles directly from the monomer. Processes have also been suggested for the preparation of poly-ε-caprolactam foam in which the polymerization of the ε-caprolactam is conducted in the presence of cell stabilizer and a blowing agent such as a volatile compound or a compound which decomposes to generate gas.

However, the properties, especially mechanical properties, of poly-ε-caprolactam foams prepared by the prior art processes have been unsatisfactory. It would be expected from properties of normal polyamide resins which have excellent mechanical properties, particularly in abrasion resistance and tensile strength and excellent chemical resistance that the poly-ε-caprolactam foams obtained by utilizing anionic fast polymerization would have similar properties. In the prior art foams however, the mechanical properties, such as tensile strength and abrasion resistance and the chemical resistance were considerably lower than the values to be expected from properties of polyamide resins. The lower mechanical and chemical properties were especially noticeable in the case of low density foams. The prior art polylactam foams whose apparent densities were below about 0.1 g./cm.³, would not retain the shape of a foam, and some foams even collapsed upon being taken out of the molds. For example, foams prepared at 120° C. using an alkali catalyst and a promoter such as acetyl caprolactam or phenyl isocyanate as proposed in the prior art having an apparent density of below 0.05 g./cm.³ had a uniform cell structure, but were mechanically very brittle, sometimes even collapsing upon taking it from the mold. The foams could easily be crumpled by hand, and as such were completely impractical. The foams prepared at 120° C. using as a promoter, tolylene diisocyanate or diphenyl carbonate having an apparent density of about 0.05 g./cm.³, were more tenacious than the foams prepared by using phenyl isocyanate as the promoter. Yet the tensile strengths and flexural strengths were still low and the other mechanical properties were relatively low in comparison with various other types of plastic foams, especially the thermosetting resin foams such as urethane, phenol and urea foams. The tensile strength normally associated with the polyamide resin was not present in the foamed material. Each of the poly-ε-caprolactam foams prepared using the various promoters suggested in the prior art by anionic fast polymerization were unsatisfactory in mechanical properties.

An object of the present invention is to provide a low density polylactam foam having improved properties, especially mechanical properties and a process for the preparation of the foam.

SUMMARY OF THE INVENTION

It has been found that the polymerization activity of the promoter has an important influence on the properties of the foams. More specifically, it has been found that in order to obtain a foam having a good cell structure and an apparent density below 0.1 g./cm.³, it is necessary that the promoter when added at 120° C. to the mixture of lactam and catalyst causes solidification of the mixture within 3 minutes, and preferably within 2 minutes. In addition, in order to obtain a practical foam having satisfactory mechanical properties, it is necessary that the promoter employed results in the relative viscosity of the polymer (measured in 98% concentrated sulfuric acid, at a concentration of 0.5% and at 25° C.), when the conversion reaches equilibrium being at least 3, and preferably being insoluble in the concentrated sulfuric acid.

DESCRIPTION OF THE PREFERRED EMBODIMENT

In order to obtain satisfactory low density foams it is indispensable in foaming that the generating rate of the gas produced by the blowing agent and the polymerization rate be in a proper relationship. If either rate is extremely large or small, it is not possible to obtain a foam having a satisfactory cellular structure and a low density. It has been found that in order to obtain a satisfactory foam having an apparent density below 0.10 g./cm.³, preferably below 0.05 g./cm.³, it is necessary to use a promoter which when added at 120° C. to the mixture of lactam and alkali catalyst, causes solidification of the mixtures within 3 minutes, and preferably 2 minutes. When a promoter satisfying this condition is used, the generating rate of a gas and the polymerization rate will be roughly in the preferable relationship within the temperature range of 100–180° C. The solidification time will vary depending upon the concentrations of the alkali catalyst and promoter. There is an optimum concentration of the alkali catalyst and especially of the promoter which gives the largest polymerization rate. When the concentration of either the alkali catalyst or promoter is higher or lower than the optimum concentration, the polymerization rate is lowered. The polymerization activity of a particular promoter is determined by measuring the time required for the solidification due to crystallization of ε-caprolactam using potassium-ε-caprolactam as the alkali catalyst, and a concentration of the promoter which gives the largest polymerization rate when the concentration of the alklai catalyst is 4 mol percent (based on ε-caprolactam). Normally, when the ration of the mol concentration of an alkali catalyst to the mol concentration of functional groups of the promoter is in the vicinity of 1, the largest polymerization rate is obtained. It does not matter particularly that the polymerization activity of the promoter is large, because it is possible to control the polymerization rate to the optimum by properly selecting the polymerization temperature of the system and the concentration of the catalyst system.

Even if a promoter satisfying the condition with regard to the solidification time is used, it is still impossible to obtain satisfactory foams having good mechanical properties. In order to obtain a foam having good mechanical properties, it is further necessary that the promoter simultaneously satisfy the condition that the relative viscosity of the polymer when the conversion reaches an equilbrium is at least 3, and preferably the polymer should be insoluble in concentrated sulfuric acid.

The relative viscosity referred to in the present invention means the viscosity of a polymer when the conversion reaches an equilibrium measured in 98% concentrated sulfuric acid at the concentration of 0.5% and a temperature of 25° C. When a promoter having a solidification time of 3 minutes or less is used, normally by carrying out polymerization for about 30 minutes, the conversion will reach an equilibrium.

As lactams which may be employed in the present invention, particular attention is directed to ε-caprolactam. In addition mixtures of at least 50 mol percent, preferably 75 mol percent of ε-caprolactam with other ω-lactams, can be employed. The ω-lactams herein referred to are those having 3–12 carbon atoms inside the lactam ring, such as pyrrolidone, piperidone, enanthlactam, caprylolactam and laurolactam.

The alkali catalyst employed by the prior art for the anionic fast polymerization of lactams may likewise be employed in the present invention providing they have a sufficient polymerization activity. For example, the alkali metal or alkaline earth metal such as sodium and potassium, the hydride, alkylates having 1–10 carbon atoms, hydroxide, oxide, carbonate, aliphatic alcoholate having 1–10 carbon atoms and amide thereof are preferable catalysts. As specific examples thereof, metallic sodium, metallic potassium, lithium hydride, sodium hydride, potassium hydride, methyl sodium, ethyl potassium, butyl lithium, cyclohexyl sodium, methylcyclohexyl potassium, lithium hydroxide, sodium hydroxide, potassium hydroxide, calcium hydroxide, sodium oxide, sodium carbonate, potassium carbonate, calcium carbonate, sodium ethylate, potassium methylate, sodium amide and potassium amide may be cited.

Upon producing a lactam basic salt by using the hydroxide, oxide, carbonate, alcoholate or amide, it is preferable to remove any water, carbon dioxide, alcohol and amine produced as by-products of the reaction with ε-caprolactam or a mixture of ε-caprolactam and other ω-lactams, prior to polymerization. The amount of the alkali catalyst employed should normally be 0.5–10 mol percent, and preferably 1–6 mol percent based on the lactam.

The promoter employed in the present invention must simultaneously satisfy the above noted conditions, that is the time from the commencement of polymerizeration induced by the addition of the promoter at 120° C. until solidification due to crystallization must be within 3 minutes, preferably 2 minutes and when the conversion reaches an equilibrium, the relative viscosity of a polylactam must be at least 3, and preferably insoluble in concentrated sulfuric acid. The promoters employed in the present invention may be divided into two classes, those comprised of a single compound and those which are a composite of at least two compounds.

One class of single compound promoters is the isocyanate compounds having at least 3 isocyanate groups bonded directly to an aromatic ring, and whose molecular weight is 200–3,000, preferably 200–400. Specific examples are 1-methylbenzene-2,4,6-triisocyanate, 1,3-dimethylbenzene-2,4,6-triisocyanate, 1,3,5-trimethylbenzene-2,4,6-triisocyanate, naphthalene-1,3,7-triisocyanate, biphenyl-2, 4,4'-triisocyanate, diphenylmethane - 2,4,4' - triisocyanate, 3 - methyldiphenylmethane - 4,6,4' - triisocyanate, triphenylmethane - 4,4',4" - triisocyanate, a lower polymer of styrene-4-isocyanate (degree of polymerization 3–20), a reaction product of trimethylolpropane with tolylene diisocyanate (reaction product of molar ratio of 1:3) and polymethylene polyphenyl isocyanate having an average of 3 or more isocyanate groups per one molecule. The single compound promoters achieve the object of the present invention when used alone. It should be appreciated that blends of these promoters may also be used and that each of these promoters may also be used in combination with other types of promoters.

The composite promoters of this invention consist of a combination of two types of promoters both of which when employed separately are not suitable for employment in this invention. The first type of promoter when added by itself to the polymerization system at 120° C. will cause solidification due to crystallization within 3 minutes. However, when the conversion reaches an equilibrium, the relative viscosity of polylactam will be less than 3. The second type of promoter results in the polymer having the required relative viscosity but does not cause solidification in the required time.

Various known promoters belong to the first type of promoter employed in the composite promoter of this invention. Specific examples of these promoters are as follows.

Acyl halides

For example, aliphatic acyl halides having 2–10 carbon atoms or aromatic acyl halides having 7–15 carbon atoms such as acetyl chloride, acetyl bromide, propionyl chloride, butyryl bromide, benzoyl chloride, benzoyl bromide, o-toluyl chloride, terephthalyl chloride, β-naphthoyl chloride and p-anisoyl chloride.

Acyl lactams

For example, aliphatic acyl lactams having 5–22 carbon atoms or aromatic acyl lactams having 10–25 carbon atoms such as acetyl caprolactam, benzoyl caprolactam, propionyl pyrrolidone and terephthalyl piperidone.

Isocyanates

For example, aromatic isocyanates having 7–15 carbon atoms having no more than 2 isocyanate groups in one molecule such as phenyl isocyanate, phenylene diisocyanate, tolylene dioscyanate and naphthyl isocyanate.

Carbonyl diimidazoles

For example, carbonyl diimidazoles having 7–20 carbon atoms such as 1,1'-carbonyl diimidazole, 1,1'-carbonylbis (2-methylimidazole) and terephthalyl diimidazole.

Aryl esters of carboxylic acid

For example, aryl esters obtained from aliphatic monocarboxylic acid or dicarboxylic acid having 2–10 carbon atoms or aromatic monocarboxylic acid or dicarboxylic acid having 7–15 carbon atoms and phenols having 6–14 carbon atoms such as phenyl acetate, phenyl propionate, phenyl benzoate, diphenyl terephthalate, (pentachlorophenyl) acetate, (2-methylphenyl) acetate and β-naphthyl benzoate.

Halogenated formic acid esters

For example, esters of a halogenated formic acid and mono- or di-alcohol having 1–9 carbon atoms or phenols having 6–14 carbon atoms such as ethyl chloroformate, phenyl chloroformate, phenylenebis (chloroformate), ethylenebis (chloroformate), diethylenebis (chloroformate) and butyl bromoformate.

Aryl carbonates

For example, aryl carbonates having 7–20 carbon atoms such as diphenyl carbonate, di-p-toluylcarbonate, diethylene glycol bis (p-toluylcarbonate).

Acyl azides

For example, aliphatic acyl azides having 2–10 carbon atoms or aromatic acyl azides having 7–15 carbon atoms such as acetyl azide, propionyl azides, benzoyl azide, terephthalyl diazide, O-toluyl azide and β-naphthoyl azide.

The foregoing are mono- or di-functional promoters.

These known promoters heretofore used in the anionic fast polymerization of ε-caprolactam using an alkali catalyst, had solidification times at 120° C. within 3 minutes, so they satisfy the condition for giving a foam of a high expansion ratio. However, they fail to satisfy the condition for giving a foam excellent in mechanical properties.

On the other hand, when certain known promoters are employed, foams are obtained which are excellent in mechanical properties. These promoters cause the relative viscosity of the polymer, when the conversion reaches an equilibrium, to be at least 3 and preferably cause the polymer to be insoluble in concentrated sulfuric acid. These promoter compounds have at least three functional groups. However, even though the promoters are at least trifunctional the compound of this type such as $PCl_3$, $P(NCO)_3$ and $Si(NCO)_4$ are low in polymerization activity as shown in Example 1, Table 1, Nos. 6, 7, 8 and 9. When polymerization is carried out at 120° C. for about 30 minutes, the conversion does not reach an equilibrium and a sufficiently high relative viscosity cannot be obtained. These promoters cannot be utilized by themselves to obtain low density foams having excellent mechanical properties.

The composite promoters of the present invention are based on the discovery that by using promoters in composite form, which when used individually, cannot achieve the object of the present invention. Superior promoters are obtained which can simultaneously satisfy the condition for giving foams having excellent mechanical properties and low density.

Generally, when additives such as promoters are used in composite form, in many cases the effect obtained becomes average of the effects when each promoter is used individually. However, in the present invention, both the polymerization rate and the relative viscosity of the polymer values of the present invention, especially the relative viscosity is higher than that obtained when each promoter is used individually. This is a distinct advantage of the mixed catalyst system of the present invention and it is a completely novel phenomenon not heretofore recognized.

As explained above, as the promoters for achieving the object of the present invention, two kinds of promoter, one the single compound type, which even if when used alone, can achieve the object of the present invention, and other, the composite promoter are disclosed. The single compound type is generally somewhat unstable, difficult to synthesize, accordingly the price is expensive and moreover some have possibility discoloring the product. The promoter employed in the composite promoters are commercially available and broadly used and accordingly the composite promoters are somewhat more preferable.

The amount of the promoter employed in the present invention varies depending upon the kind of alkali catalyst, the promoter and other conditions. However, in order to obtain an effective polymerization rate, an amount within the range of 0.1–10 mol percent, preferably 0.2–5 mol percent is employed. In the case of using some promoters, for example, esters such as phenyl acetate, phenyl benzoate or $PCl_3$, they have possibilities of reacting with the alkali catalyst, or a lactam basic salt, and converting said salt to an inert compound, therefore, when these promoters are used, it is preferable to make sufficiently high the concentration of the lactam basic salt. In the present invention, in case the composite promoter of the type is used, there is no particular limitation on the ratio of the two kinds of promoter, however, normally a molar ratio of 1:5 to 5:1 is used. In order to obtain a good foam, the polymerization temperature in the process of the present invention is preferably 100–180° C., with 100–130° C. being preferred. Namely, when the promoter of the present invention is used, at the temperature range of 100–180° C., the polymerization rate and the generating rate of a gas are roughly in a preferable relationship. At the temperature below 100° C., generally the polymerization rate is small, and at the temperature above 180° C., the generating rate of a gas becomes excessive.

As a blowing agent generating an inert gas at the time of polymerization, known volatile type blowing agent and decomposition type chemical blowing agent are used. As examples of the volatile type blowing agent, n-heptane, n-octane, cyclohexane, methylcyclohexane, benzene, toluene, xylene, dioxane, dibutyl ether, trioxane and ligroin are used. As examples of the decomposition type blowing agents, azoisobutylonitrile and allyl azides may be cited. In the present invention, it is preferable to use a cell stabilizer such as a surface active agent, for example, metal salts of stearic acid, silicones, metal salts of phosphoric acid ester with an aliphatic alcohol which does not adversely affect the polymerization activity.

The polymerization and the foaming according to the present invention may be practiced in the presence of various modifiers which do not interfere with the polymerization, for example, powder fillers, fibrous fillers, plasticizers, coloring agents, release agents, antioxidants and flame retardants.

In the process for the preparation of poly-ε-caprolactam foam using the present invention, the polymerization and the foaming may be carried out in the same container. It is also possible to carry out prepolymerization with stirring, thereafter move the polymerization mixture to another container or location and complete the polymerization and the foaming. Stirring of the mixture during preparation of the foam is necessary for uniform dispersion of the promoter and for dispersing the nuclei of cells through the mixture. To stir the mixture conventional mechanical methods are employed. The stirring speed should be 50–10,000 r.p.m., and preferably 100–1,000 r.p.m. The stirring time varies depending upon the polymerization conditions of the system, however, when the promoter of the present invention is used, a range of from 10 seconds to 3 minutes, preferably from 20 seconds to 2 minutes is adopted. These operations are carried out normally under atmospheric pressure, however, it is also possible to carry out prepolymerization under a superatmospheric pressure, thereafter complete the polymerization and the foaming under atmospheric pressure or a reduced pressure .

The poly-ε-caprolactam foams obtained by the process of the present invention are open cell and have excellent mechanical strength, adiabatic properties, shock absorption properties, chemical resistance and heat resistance. The foams are useful as an adiabatic material, a core material of a sandwich panel, flooring material, filters, shock absorption materials, etc.

The present invention will be explained in more detail by the following examples, wherein percent means percent by weight.

EXAMPLE 1

A comparison was made of the results obtained with the composite catalysts of the present invention with the results obtained using each compound of the catalyst separately.

To molten ε-caprolactam at 90–95° C., particles of potassium hydroxide were so added that the resultant potassium ε-caprolactam concentration was 4 mol percent based on the ε-caprolactam. The water produced as a byproduct was removed under a reduced pressure. 30 g. of the ε-caprolactam solution containing the potassium-ε-caprolactam was placed in a test tube. The air inside the tube was replaced with nitrogen, and the tube was heated to 120° C. When the temperature reached a constant temperature of 120° C., a predetermined amount of the promoter was added. The test tube was then shaken until the reaction mixture became viscous and did not flow. The time from the addition of the promoter until the material did not flow was measured and recorded as a solidification time. After addition of the promoter, the polymerization was continued for 30 minutes. The test tube was then immersed in a methanol solution of dry ice to stop the polymerization, and the conversion of the obtained polymer and the solution viscosity were measured. The conversion was calculated from decrease of the weight after the polymer was ground and extracted with boiling water for 6 hours and dried. The relative viscosity $\eta_{rel}$ was measured in 98% concentrated sulfuric acid at the concentration of 0.5% at 25° C. The results are shown in Table 1.

solidification times are all within 3 minutes, and when polymerization is carried out for 30 minutes, the conversions reach an equilibrium with the relative viscosities of the polymer being at least 3 to insoluble in concentrated sulfuric acid. Accordingly, composite promoters simultaneously satisfying both conditions for obtaining foams having low density and excellent mechanical properties are the object of the present invention.

EXAMPLE 2

In this example a further comparison is made of the composite promoters of the present invention with other promoters.

100 g. of ε-caprolactam solution containing 4 mol percent of potassium-ε-caprolactam was prepared as described in Example 1, was placed in a 70 mm. test tube. The air inside the tube was replaced with nitrogen. The

TABLE 1.—INFLUENCE OF A PROMOTER ON POLYMERIZATION

| No. | Kind of promoter | Concentration (mol percent) | Solidification time (min.) | Conversion (percent) | Relative viscosity $\eta_{rel}$ |
|---|---|---|---|---|---|
| 1 | Acetyl caprolactam | 1.5 | 0.7 | 91 | 1.5 |
| 2 | Phenyl isocyanate | 1.5 | 1.6 | 92 | 1.5 |
| 3 | Tolylene diisocyanate | 1.5 | 1.0 | 89 | 2.6 |
| 4 | Diphenyl carbonate | 1.5 | 1.3 | 89 | 2.9 |
| 5 | Ethyl chloroformate | 1.5 | 0.8 | 92 | 1.7 |
| 6 | PCl$_3$ | 1.0 | 7.5 | 57 | 3.0 |
| 7 | PCl$_3$ | 0.5 | 6.5 | 8 | 1.6 |
| 8 | P(BCO)$_3$ | 1.0 | 3.3 | 79 | 4.0 |
| 9 | Si(NCO)$_4$ | 1.0 | 12.0 | 32 | 2.4 |
| 10 | Acetyl caprolactam-PCl$_3$ | 1-0.5 | 0.8 | 90 | 3.0 |
| 11 | Phenyl isocyanate-P(NCO)$_3$ | 1-0.5 | 1.6 | 92 | 3.2 |
| 12 | Tolylene diisocyanate-P(NCO)$_3$ | 1-0.5 | 1.2 | 90 | (¹) |
| 13 | Tolylene diisocyanate-Si(NCO)$_4$ | 1-1 | 1.2 | 88 | (¹) |
| 14 | Diphenyl carbonate-P(NCO)$_3$ | 1-0.5 | 1.5 | 85 | 4.7 |
| 15 | Ethyl choroformate-PCl$_3$ | 1-0.5 | 0.9 | 91 | 4.2 |
| 16 | Ethyl chloroformate-P(NCO)$_3$ | 1-0.5 | 0.8 | 91 | (¹) |

¹ Insoluble.

In Table 1, Nos. 1–5 are examples of promoters resulting in solidification times within 3 minutes at 120° C. Nos. 6–9 are examples of at least trifunctional promoters resulting in polymers having relative viscosities of at least 3 in concentrated sulfuric acid when conversion reaches an equilibrium. Nos. 10–16 are examples of the composite catalysts of the present invention. As is apparent from these examples, the promoters of Nos 1–5 result in solidification times of within 3 minutes at 120° C., however, when the conversion reaches an equilibrium the relative viscosities are less than 3 which is low as compared with the composie promoters used in the present invention, and they cannot therefore product foams having excellent mechanical properties. The promoters of Nos. 6–9 result in solidification times of more than 3 minutes at 120° C., and the polymerization rates are too small in order to obtain low density foams. Moreover, when these promoters are used, even though polymerization is carried out at 120° C. for 30 minutes the conversion does not reach an equilibrium.

However, in cases of the composite promoters using a combination of promoters as shown in Nos. 10–16, the tube was heated to a predetermined temperature and 10% benzene and 1% dimethylsiloxane ("Toray Silicone SH 200" 50 cps.), a cell stabilizer, were added. The mixture was stirred using an oar type blade, at 400 r.p.m. and a predetermined amount of a promoter was added. The resultant mixture was stirred for the predetermined period, thereafter stirring was stopped, the stirrer was removed and the system was foamed. The test tube was continuously heated for 30 minutes. Thereafter the test tube was taken from the heating bath, left to cool. The foam was removed from the test tube. The conversion and the relative viscosity $\eta_{rel}$ of the prepared foam were measured by methods described in Example 1. The tensile strength and the flexural strength of the foam were also measured. The results are shown in Table 2.

TABLE 2.—INFLUENCE OF A PROMOTER ON THE PHYSICAL PROPERTIES OF A FOAM

| No. | Kind of promoter | Concentration (mol percent) | Temperature (° C.) | Stirring time (min.) | Apparent density (g./cm.³) | Conversion (percent) | Relative viscosity $\eta_{rel}$ | Tensile strength (kg./cm.²) | Flexural² strength (kg./cm.²) |
|---|---|---|---|---|---|---|---|---|---|
| 1 | Acetyl caprolactam | 1.5 | 120 | 0.6 | 0.048 | 88 | 1.6 | 0.1 | 0.2 |
| 2 | Phenyl isocyanate | 1.5 | 120 | 1.1 | 0.049 | 92 | 1.5 | 0.1 | 0.2 |
| 3 | Tolylene disocyanate | 1.5 | 120 | 1.0 | 0.044 | 90 | 2.4 | 1.6 | 3.4 |
| 4 | Diphenyl carbonate | 1.5 | 120 | 1.2 | 0.052 | 91 | 2.7 | 1.0 | 2.8 |
| 5 | Ethyl chloroformate | 1.5 | 120 | 0.5 | 0.040 | 91 | 1.8 | 0.8 | 2.0 |
| 6 | PCl$_3$ | 1.0 | 120 | 6.0 | (³) | 44 | 2.8 | | |
| 7 | PCl$_3$ | 1.0 | 160 | 3.0 | 0.120 | 87 | (⁴) | 1.72 | 14.8 |
| 8 | P(NCO)$_3$ | 1.0 | 120 | 2.5 | 0.092 | 73 | 3.4 | 8.8 | 11.2 |
| 9 | Si(NCO)$_4$ | 1.0 | 120 | 10.0 | (³) | 34 | 2.0 | | |
| 10 | Acetyl caprolactam-PCl$_3$ | 1-0.5 | 120 | 0.7 | 0.048 | 90 | 3.1 | 5.4 | 3.8 |
| 11 | Phenyl isocyanate-P(NCO)$_3$ | 1-0.5 | 120 | 1.0 | 0.044 | 92 | 3.2 | 5.0 | 3.4 |
| 12 | Tolylene diisocyanate-Si(NCO)$_4$ | 1-1 | 120 | 1.0 | 0.040 | 89 | (⁴) | 5.2 | 3.4 |
| 13 | Diphenyl carbonate-P(NCO)$_3$ | 1-0.5 | 120 | 1.3 | 0.048 | 91 | 4.5 | 4.9 | 3.8 |
| 14 | Ethyl chloroformate-PCl$_3$ | 1-0.5 | 120 | 0.7 | 0.045 | 90 | 4.2 | 4.7 | 3.7 |
| 15 | Ethyl chloroformate-P(NCO)$_3$ | 1-015 | 120 | 0.5 | 0.037 | 93 | (⁴) | 4.2 | 3.3 |
| 16 | Ethyl chloroformate-Si(NCO)$_4$ | 1-1 | 120 | 0.5 | 0.044 | 91 | (⁴) | 4.7 | 3.5 |

¹ Using a "Dumbbell" type test piece, measured at a tensile speed of 10 mm./min.
² Using a 10 x 25 120 mm. test piece, measured in accordance with JIS A9511.
³ Not foamed.
⁴ Insoluble.

In Table 2, the promoters Nos. 1–5 are examples of a promoter resulting in the solidification time of within 3 minutes at 120° C., giving low density foams which are very brittle and remarkably low in mechanical strengths. The promoters Nos. 6–9 are examples of at least trifunctional promoters, which have a low polymerization rate with resulting foams having a relatively high density.

Namely, upon using $PCl_3$ and $Si(NCO)_4$, the polymerization system does not foam at 120° C. In the case of using $PCl_3$ at 160° C. the polymerization system is foamable, however, a foam having an apparent density of below 0.1 g./cm.$^3$ are not obtained. In the case of using $P(NCO)_3$, a foam having an apparent density of below 0.1 g./cm.$^3$ is obtained, however, having an apparent density of below 0.05 g./cm.$^3$ are not obtained.

When the composite promoters of the present invention are employed such as Nos. 10–16, in each case low density foam having an apparent density below 0.05 g./cm.$^3$ is obtained. The mechanical properties of these foams are very superior to those of the foams of the same specific gravities obtained by using the promoters of Nos. 1–5.

EXAMPLE 3

In this example a comparison of the single compound promoters of the present invention with the other ordinary promoters is shown.

By the methods disclosed in Example 1, polymerizations were carried out and the solidification times, the conversions and the relative viscosities $\eta_{rel}$ of using the single compound promoters of the present invention and the comparative prior art promoters were measured. The results are shown in Table 3.

By the method disclosed in Example 2, foams were prepared, and the conversions, relative viscosities $\eta_{rel}$, tensile strengths and flexural strengths thereof were measured. The results were shown in Table 4.

TABLE 4.—INFLUENCE OF A PROMOTER EXERTED ON THE PHYSICAL PROPERTIES OF A FOAM

| No. | Kind of promoter | Number of functional group | Concentration (mol percent) | Temperature (° C.) | Stirring time (sec.) | Apparent density (g./cm.³) | Conversion (percent) | Relative viscosity $\eta_{rel}$ | Tensile¹ strength (kg./cm.²) | Flexural² strength (kg./cm.²) |
|---|---|---|---|---|---|---|---|---|---|---|
| 1 | PAPI³ | 3 | 1 | 120 | 50 | 0.042 | 89 | (⁴) | 5.0 | 7.2 |
| 2 | 1-methylbenzene-2,4,6-triisocyanate | 3 | 1 | 120 | 40 | 0.046 | 89 | (⁴) | 5.4 | 7.7 |
| 3 | Triphenyl-4,4',4''-triisocyanate | 3 | 1 | 120 | 40 | 0.050 | 90 | (⁴) | 6.5 | 8.8 |
| 4 | PAPI-Triphenyl-4,4',4''-triisocyanate | 3–3 | 0.5–0.5 | 120 | 50 | 0.043 | 88 | (⁴) | 5.0 | 7.4 |
| 5 | Silicon tetraisocyanate | 4 | 2 | 150 | 360 | (⁵) | 40 | 2.9 | | |
| 6 | Polycarbonate³ | (⁶) | 1 | 130 | 150 | 0.050 | 80 | 2.3 | 1.4 | 2.7 |

¹ Using a "Dumbbell" type test piece, measured at a tensile speed of 10 mm./min.
² Measured in accordance with JIS A 9511.
³ Polymethylene polyphenyl isocyanate, manufactured by Sumitomo Chemical Industry Co., Ltd. "PAPI."
⁴ Insoluble.
⁵ Not foamed.
⁶ Above 4.

In Table 5, Nos. 5–6 are examples of an at least trifunctional promoter other than those of the present invention and Nos. 1–4 are examples of the promoter of the present invention. When the promoters of the present invention are used, low density foams having high tensile strengths of 5–7 kg./cm.² are obtained. The same can be said of the flexural strengths, and it is apparent that when the promoters of the present invention are used poly-ε-caprolactam foams are obtained which are excellent in mechanical properties. No. 5 is an example of a promoter having such a low polymerization activity that a foam is not obtained. No 6 is an example of a promoter which fails to give a polymer of a high relative viscosity, therefore the foam is inferior in mechanical properties.

EXAMPLE 5

500 g. of ε-caprolactam solution containing 4 mol percent of potassium-ε-caprolactam was charged in a 10 liter

TABLE 3.—INFLUENCE OF A PROMOTER ON THE POLYMERIZATION

| No. | Kind of Promoter | Number of functional group | Concentration (mol percent) | Solidification time (min.) | Conversion (percent) | $\eta_{rel}$ |
|---|---|---|---|---|---|---|
| 1 | Methyl silicon triisocyanate | 3 | 1 | 9.0 | 45 | 2.2 |
| 2 | PAPI¹ | 3 | 1 | 1.5 | 90 | Insoluble.² |
| 3 | 1-methylbenzene-2,4,6-triisocyanate | 3 | 1 | 1.5 | 92 | Do. |
| 4 | Naphthalene-1,3,7-triisocyanate | 3 | 1 | 1.8 | 89 | Do. |
| 5 | Triphenylmethane-4,4',4''-triisocyanate | 3 | 1 | 1.4 | 90 | Do. |
| 6 | Silicon tetraisocyanate | 4 | 2 | 11.5 | 35 | 2.4 |
| 7 | Polycarbonate³ | (⁴) | 1 | 3.5 | 87 | 2.3 |

¹ Polymethylene polyphenyl isocyanate, manufactured by Sumitomo Chemical Industry Co., Ltd., "PAPI."
² Partially insolube in 98% concentrated sulfuric acid and viscosity could not be measured.
³ "Panraito" K-1300, manufactured by Teijin Limited.
⁴ Above 4.

In Table 3, Nos. 1–5 are examples of a trifunctional promoter and Nos. 6–7 are examples of an at least tetrafunctional promoter, of which Nos. 2–5 are promoters of the present invention. When trifunctional promoters such as methyl silicon triisocyanate, silicon tetraisocyanate and polycarbonate are used, the solidification times are more than 3 minutes and therefore they cannot be used as promoters to obtain low density foams. When the promoters of the present invention Nos. 2–5 are employed the solidification times are short and polymers are of a high relative viscosity, resulting in low density poly-ε-caprolactam foams having excellent mechanical properties.

EXAMPLE 4

This example also compares the single compound promoters used in the present invention with other promoters.

cylindrical container. The air inside the container was replaced by nitrogen and the container was heated to a predetermined temperature. To said solution of 10% of toluene and 1% of dimethylsiloxane ("Toray Silicone SH 200") as a cell stabilizer were added. While the resultant solution was being stirred (400 r.p.m.), a predetermined amount of a promoter was added and the stirring was continued for a predetermined time. Thereafter the stirring was stopped and the blade was taken out from the system and the system was foamed. After continuing the heating for 30 minutes, the container was taken out of the heating bath and left to cool. Thereafter a foam was taken from the container. The results are shown in Table 5, each of the prepared foams has a low density and good mechanical properties.

TABLE 5

| No. | Kind of promoter | Concentration (mol percent) | Temperature (° C.) | Stirring time (min.) | Apparent density (g./cm.³) |
|---|---|---|---|---|---|
| 1 | Terephthalyl chloride-PCl₃ | 0.5-0.5 | 125 | 1.3 | 0.048 |
| 2 | 1,1'-carbonylbis(2-methyl-imidazole)-PCl₃. | 0.5-0.5 | 125 | 0.9 | 0.044 |
| 3 | Diphenyl terephthalate-P(NCO)₃. | 0.5-0.5 | 125 | 1.1 | 0.046 |
| 4 | Phenyl acetate-P(NCO)₃ | 1-0.5 | 130 | 0.9 | 0.045 |
| 5 | Ethylenebis(chloroformate)-PCl₃. | 0.5-0.5 | 130 | 0.7 | 0.039 |
| 6 | Ethylenebis(chloroformate)-Si(NCO)₄. | 0.5-1 | 130 | 0.6 | 0.039 |
| 7 | Tolylene diisocyanate-acetyl caprolactam-PCl₃. | 1-0.5-0.5 | 130 | 0.8 | 0.042 |
| 8 | Diphenyl carbonate-PCl₃-P(NCO)₃. | 0.5-0.5-0.5 | 130 | 1.2 | 0.046 |

EXAMPLE 6

In this example a mixture of lactams is employed. Example 5 was repeated with the exception that a mixture of 90 mol percent of ε-caprolactam containing 4 mol percent of potassium-ε-caprolactam and 10 mol percent of ω-lauryllactam was used in place of the ε-caprolactam containing 4 mol percent of potassium-ε-caprolactam, employed in Example 5. Foams were prepared. The results were shown in Table 6. Each of the prepared foams has a low density and good mechanical properties.

TABLE 6

| No. | Kind of promoter | Concentration (mol percent) | Temperature (° C.) | Stirring time (min.) | Apparent density (g./cm.³) |
|---|---|---|---|---|---|
| 1 | Tolylene diisocyanate-PCl₃ | 1-0.5 | 130 | 1.2 | 0.043 |
| 2 | Diphenyl carbonate-P(NCO)₃ | 1-0.5 | 130 | 1.4 | 0.047 |
| 3 | PAPI | 1 | 130 | 0.8 | 0.039 |

EXAMPLE 7

Example 2 was repeated with the exception that ε-caprolactam solution containing 4 mol percent of sodium-ε-caprolactam obtained by using caustic soda particle instead of particles of potassium hydroxide was employed. Foams were prepared as disclosed in Example 2. The results are shown in Table 7. Each of the prepared foams has good mechanical properties.

TABLE 7

| No. | Kind of promoter | Concentration (mol percent) | Temperature (° C.) | Stirring time (min.) | Apparent density (g./cm.³) |
|---|---|---|---|---|---|
| 1 | Tolylene diisocyanate-P(NCO)₃ | 1-0.5 | 130 | 1.5 | 0.049 |
| 2 | Ethyl chloroformate-PCl₃ | 1-0.5 | 130 | 0.8 | 0.040 |
| 3 | PAPI | 1 | 130 | 1.0 | 0.041 |

EXAMPLE 8

This example shows the concurrent use of the single compound promoters of the invention and other promoters. Foams were prepared as in Example 5. The results are shown in Table 8. Each of the prepared foams obtained in this example has a low density and good mechanical properties.

TABLE 8

| No. | Kind of promoter | Concentration (mol percent) | Temperature (° C.) | Stirring time (min.) | Apparent density (g./cm.³) |
|---|---|---|---|---|---|
| 1 | PAPI-acetyl caprolactam | 0.5-1 | 120 | 0.8 | 0.042 |
| 2 | PAPI-ethyl chloroformate | 1-0.5 | 120 | 0.6 | 0.040 |
| 3 | PAPI-tolylene diisocyanate | 0.5-1 | 120 | 0.7 | 0.042 |
| 4 | PAPI-diphenyl carbonate | 1-0.5 | 120 | 0.8 | 0.044 |
| 5 | PAPI-PCl₃ | 1-0.5 | 120 | 1.0 | 0.048 |
| 6 | 1-methylbenzene-2,4,6-triisocyanate tolylene diisocyanate. | 0.5-1 | 120 | 1.2 | 0.047 |
| 7 | 1-methylbenzene-2,4,6-triisocyanate-P(NCO)₃ | 1-0.5 | 120 | 1.2 | 0.048 |

The following is claimed:

1. In the process for the preparation of polylactam foam wherein a polymerizable member is selected from the group consisting of ε-caprolactam and a blend of lactams containing more than 50 mol percent of ε-caprolactam is anionically polymerized at a temperature of from about 100 to 180° C. in the presence of an alkaline catalyst, a blowing agent, and a promoter, the improvement which comprises employing as the promoter a composition comprised of:

(a) a first compound selected from the group consisting of an aliphatic acyl halide having 2–10 carbon atoms; an aromatic acyl halide having 7–15 carbon atoms; an aliphatic acyl lactam having 5–22 carbon atoms; an aromatic acyl lactam having 10–25 carbon atoms; an aromatic isocyanate having 7–15 carbon atoms and having no more than 2-isocyanate groups; a carbonyl diimidazole having 7–20 carbon atoms; an aryl ester of an aliphatic monocarboxylic acid or dicarboxylic acid having 2–10 carbon atoms or an aromatic monocarboxylic acid or dicarboxylic acid having 7–15 carbon atoms and a phenol having 6–14 carbon atoms; an ester of a halogenated formic acid and mono- or di-alcohol having 1–9 carbon atoms or a phenol having 6–14 carbon atoms; an aryl carbonate having 7–20 carbon atoms; an aliphatic acyl azide having 2–10 carbon atoms and an aromatic acyl azide having 7–15 carbon atoms, and (b) a second compound selected from the group consisting of PCl₃, Si (NCO)₄ and P(NCO)₃.

2. The process according to claim 1, wherein said blend of lactams is comprised of ε-caprolactam and ω-lactam having 3–12 carbon atoms inside the lactam ring.

3. The process according to claim 1, wherein said alkaline catalyst is a member selected from the group consisting of sodium, potassium, and the hydride, alkylate having 1–10 carbon atoms, hydroxide, oxide, carbonate, aliphatic alcoholate having 1–10 carbon atoms or amide of sodium or potassium.

4. The process according to claim 1, wherein the mixture contains 0.5–10 mol percent of the alkali catalyst based on the lactam.

5. The process according to claim 1, wherein the molar ratio of the first compound to the second compound is 1:5 to 5:1.

6. The process according to claim 1, wherein 0.1–10 mol percent of the promoter is added.

7. The process according to claim 1, wherein the polymerization temperature is 100–130° C.

8. In the process for the preparation of a polylactam foam, wherein a polymerizable member selected from the group consisting of ε-caprolactam and a blend of lactams containing more than 50 mol percent of ε-caprolactam is anionically polymerized at a temperature of from about 100 to 180° C. in the presence of an alkaline catalyst, a blowing agent, and a promoter, the improvement which comprises employing as the promoter a composition comprised of:

(a) a first compound selected from the group consisting of acetyl caprolactam; phenyl isocyanate; tolylene diisocyanate; diphenyl carbonate; ethyl chloroformate; terphthalyl chloride; 1,1'-carbonyl bis (2-methylimidazole); diphenyl terephthalate; ethylene bis(chloroformate) and phenyl acetate and (b) a second compound selected from the group consisting of $PCl_3$, $Si(NCO)_4$ and $P(NCO)_3$.

References Cited

UNITED STATES PATENTS

| | | | |
|---|---|---|---|
| 3,210,324 | 10/1965 | Black | 260—78 P |
| 3,234,152 | 2/1966 | Fuller | 260—78 L |
| 3,236,789 | 2/1966 | Fuller | 260—2.5 W |
| 3,274,132 | 9/1966 | Giberson | 260—78 L |
| 3,300,422 | 1/1967 | Bayerlein et al. | 260—2.5 W |
| 3,423,372 | 1/1969 | Steely | 260—78 L |
| 3,449,269 | 10/1969 | Hyde | 260—78 L |

MURRAY TILLMAN, Primary Examiner

M. FOELAK, Assistant Examiner

U.S. Cl. X.R.

260—37 R, 78 L, 78 P